(12) United States Patent
Twitty

(10) Patent No.: US 8,017,166 B2
(45) Date of Patent: Sep. 13, 2011

(54) METHOD OF PRODUCING STACKABLE LOW-FAT SNACK CHIPS

(76) Inventor: Steven Amory Twitty, Dunlap, TN (US)

( * ) Notice: Subject to any disclaimer, the term of this patent is extended or adjusted under 35 U.S.C. 154(b) by 962 days.

(21) Appl. No.: 10/978,966

(22) Filed: Nov. 1, 2004

(65) Prior Publication Data

US 2006/0093722 A1     May 4, 2006

(51) Int. Cl.
*A23L 1/01* (2006.01)
(52) U.S. Cl. ......... 426/439; 426/503; 426/512; 426/549
(58) Field of Classification Search .......................... None
See application file for complete search history.

(56) References Cited

U.S. PATENT DOCUMENTS

| | | |
|---|---|---|
| 3,872,752 A | 3/1975 | Remde |
| 3,903,674 A | 9/1975 | Brush |
| 3,905,285 A | 9/1975 | Campbell |
| 3,937,848 A | 2/1976 | Campbell |
| 4,013,234 A | 3/1977 | Fay |
| 4,108,033 A | 8/1978 | Bembenek |
| RE31,819 E | 1/1985 | Weiss |
| 4,844,919 A * | 7/1989 | Szwerc ........................... 426/94 |
| 5,085,884 A | 2/1992 | Young |
| 5,236,733 A | 8/1993 | Zimmerman |
| 5,500,240 A | 3/1996 | Addesso |
| 5,964,146 A * | 10/1999 | Kelly et al. ..................... 99/467 |
| 6,067,899 A | 5/2000 | Caridis |
| 6,146,678 A | 11/2000 | Caridis |
| 7,332,189 B2 * | 2/2008 | Mihalos et al. ............... 426/497 |

FOREIGN PATENT DOCUMENTS

| | | |
|---|---|---|
| EP | 05 394 028.4-2114 | 5/2006 |
| FR | 2291709 | 6/1976 |
| WO | PCT/US01/03846 | 8/2001 |

\* cited by examiner

*Primary Examiner* — Lien Tran
(74) *Attorney, Agent, or Firm* — Baker Donelson Bearman Caldwell & Berkowitz PC

(57) ABSTRACT

Stackable, farinaceous based low-fat snack chips are produced from a thin chain link strip of dough blanks by baking the strip in an oven with the strip blanks supported and carried by a lower mold assembly. Alternatively, the strip may be partially baked and then fried with the strip blanks sandwiched between upper and lower molds to produce reduced fat stackable snack chips.

10 Claims, 8 Drawing Sheets

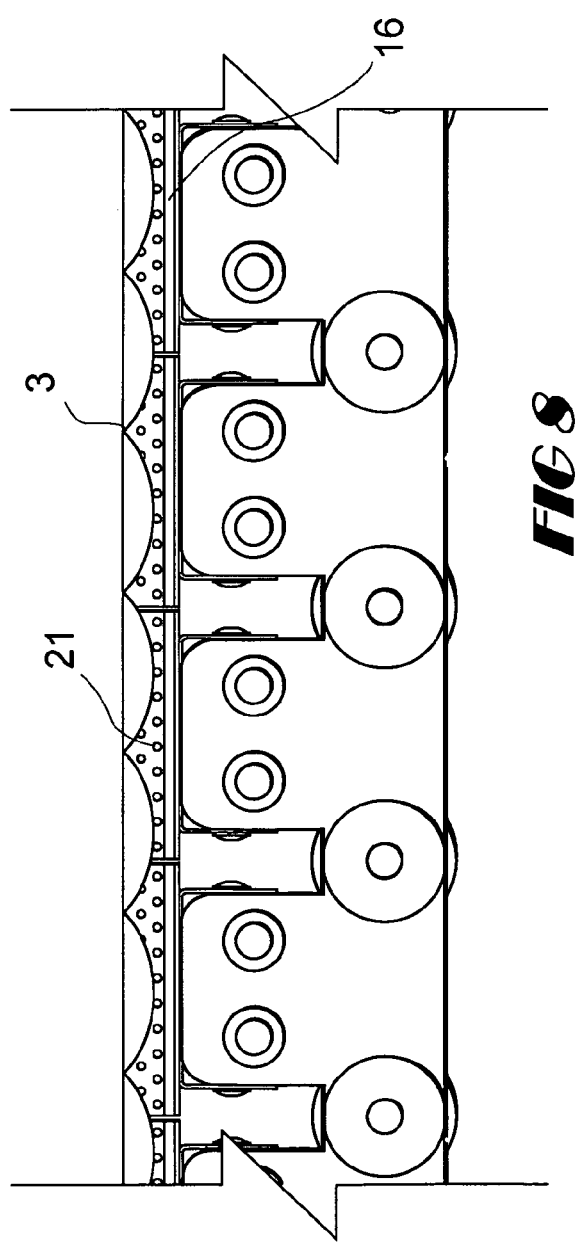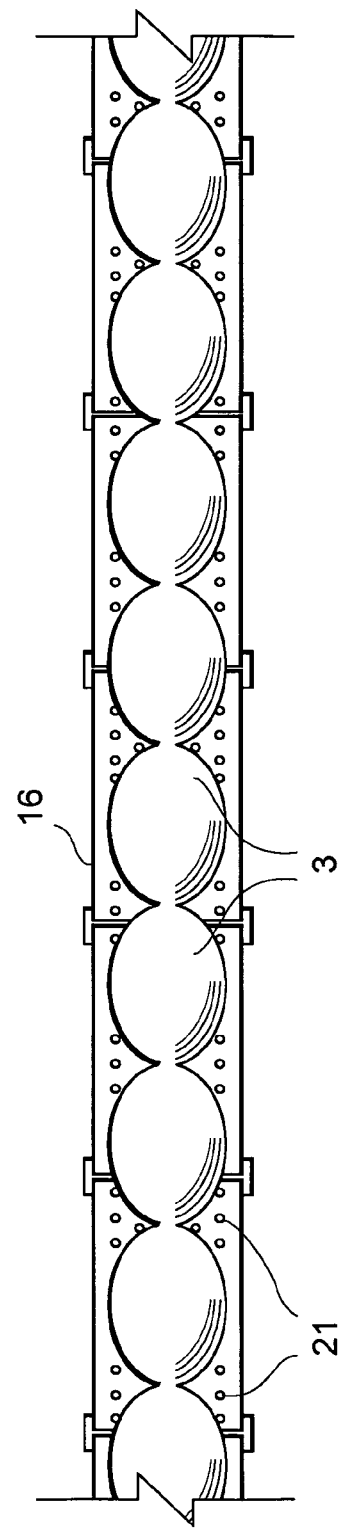

METHOD OF PRODUCING STACKABLE LOW-FAT SNACK CHIPS

TECHNICAL FIELD

This invention relates generally to packaged snack food chips and particularly to a method for producing stackable low fat and reduced fat snack chips.

BACKGROUND OF THE INVENTION

Potato-based and/or other farinaceous-based sheeted and baked, low-fat snacks are popular due to a growing consumer awareness of caloric intake and a general knowledge that fats and oils contribute largely to a food's overall caloric value, including snack foods. It is through this growing consumer demand for less oily foods that baked snacks, including potato-based and other farinaceous-based, sheeted snacks, have been developed. An example of one type of baked snack is described in U.S. Pat. No. 5,500,240, wherein a sheeted farinaceous-based dough is sheeted to a prescribed thickness, cut into desired shapes, and baked to a moisture of less than 4%, yielding a low-fat snack chip having a blistered appearance and crisp texture.

Generally, sheeted and baked snack chips are produced from sheeting dough composed of farinaceous-based materials, such as potato flakes, or other materials such as wheat flour, corn flour, and other minor ingredients such as emulsifiers. Potato-based farinaceous materials and/or other farinaceous-based materials are blended with water in a suitable mixer such as described in U.S. Pat. No. 4,013,234. After re-hydration, the resulting dough is sheeted through a multi-station sheeting system as commonly used in the biscuit industry, or a single-station sheeting system as commonly used in the fabricated snack chip industry. The resulting sheet has a thickness between 0.4 mm to 2.0 mm, more commonly 0.6 mm to 11.0 mm, and a width as applicable to the baking system. The dough pieces generally are cut from the dough sheet in a "no scrap" pattern so that only narrow strips of dough along the edges of the sheet and/or between the cut dough pieces are returned to the mixer as usable scrap, leaving the remainder of the cut sheet, up to 98%, to be processed into finished product.

After cutting, the sheeted and cut dough pieces are transferred into a baking/drying oven that uses impingement, direct-fired, or convection-type heating. This baking/drying oven generally features a flat or nearly flat moving band to carry the separate pieces through one or more baking chambers, producing a baked snack chip of a desired moisture, usually between 1.0% and 3.0% by weight. After baking, the snack chips drop off the moving band onto a take-out conveyor, and can be lightly sprayed with edible oil, then seasoned and packaged in flexible material, such as foil-laminated polypropylene. Sheeted and baked chips could also be packaged in cylindrical canisters or other sleeve-type containers, although such chips are not stackable therein due to their random and irregular shape (warping) caused by uneven moisture loss during baking. This is well known in the industry and is due to normally occurring variations in sheeted dough density and concomitant variations in drying time of the various densities of dough in the sheet.

Sheeted, baked snack chips made from farinaceous-based materials offer consumers low oil/fat content, generally 10% or less by weight, as compared to fried chips, which typically have some 32% to 42% oil by weight. They have consistent quality through the use of consistent quality raw materials and a continuous processing system.

Unlike current baked, sheeted, snack chips that are not stackable, stackable fried snack chips offer enhanced flavor, improved product presentation through style of packaging, convenience of storage, and longer shelf-life by way of integrity of packaging materials, especially when packed in nitrogen flushed, hermetic, composite fiber canisters. They are one of the fastest growing segments today within the international snack food industry. Such fried chips generally are manufactured by processing individual dough blanks in cooking oil such that they float up against a top mold, resulting in a chip with the curved shape of the top mold. However, they may also be made by frying chain-linked dough sandwiched between a top and a bottom mold, as set forth in U.S. Pat. No. 3,905,285. Without a top mold, the dough blanks would simply float off the bottom molds once they entered the frying oil and the ability to shape and guide the chips would be lost. In addition, the double-mold configuration has limited the thickness of dough blanks that practically may be used on fryers.

Weiss et al., U.S. Pat. No. RE31,819, describes a process for producing stackable chips in which a strip of dough is sandwiched between upper and lower chain molds and fried. A disadvantage of this technique if baking were to be used as the cooking method is that the flow of hot air across the dough is inhibited, leading to poorly cooked chips and/or an excessively long cooking time.

It thus is seen that baked and fried snack food chips each have their desirable and undesirable features. Baked chips have low oil and fat content but generally are not stackable and have limited flavor, product presentation, shelf life, and packaging integrity. Conversely, stackable, fried snack chips have just the opposite attributes. If a way were to be developed by which snack chips could be commercially and efficiently produced which had the desirable attributes of both the baked and the fried products, a distinct advance would be made in this very mature industry. Accordingly, it is to the provision of such that the present invention is primarily directed.

SUMMARY OF THE INVENTION

In a preferred form of the invention, stackable, farinaceous based low-fat snack chips are produced by forming a farinaceous based dough into a thin, uniformly shaped, continuous chain link strip of blanks. The strip is baked in a baking oven with endless chain molds onto which the blanks are placed prior to baking. Baking the dough in chain-link strip fashion facilitates removal of the baked product in unitary, rather than individual, form, and thus enhances post-baking processing and handling. The baked strip is then dusted with seasoning, and the seasoned strip broken into individual stackable chips with low oil content.

It will be appreciated that the baked chain link of chips can be sprayed with a coating of oil to help enhance flavor and improve the adhesion of powdered seasoning to the product. Moreover, the chain link strip of baked chips may be separated into individual chips prior to oil spraying and seasoning.

In another preferred form of the invention a method of producing stackable, farinaceous based reduced fat snack chips comprises the steps of forming a farinaceous based dough into a thin chain link strip of blanks. The strip is baked in a baking oven, on endless chain molds, to a partially baked state. The partially baked strip is fried in a fryer, on endless chain molds. The fried strip is then removed from the fryer, seasoned, and broken into individually stackable chips with reduced oil content.

BRIEF DESCRIPTION OF THE DRAWINGS

FIG. 8 is a perspective view of the continuous chain of raw dough pieces delivered onto the top of the endless chip forming molds.

FIG. 9 is a top plan view of the continuous chain of raw dough pieces delivered into the top of the endless chip forming molds.

DETAILED DESCRIPTION

Figure 1:
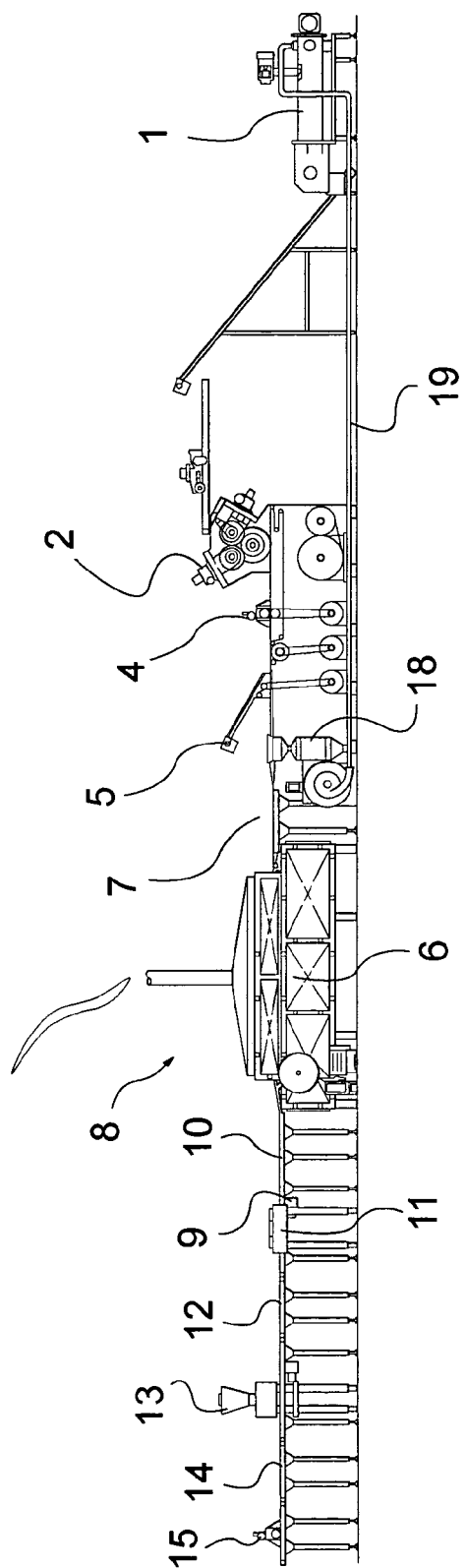
FIG. 1 is a diagrammatical view of a production line that may be used in practicing the invention in a preferred form.

With reference in more detail to the drawings, there is shown a production line in FIG. 1 that may be used in producing stackable, farinaceous-based low fat snack ships in accordance with the principles of the invention. "Farinaceous" is herein meant to include potato-based flakes, granules, and starch or any combination thereof as well as any other farinaceous materials and minor additional ingredients such as leavenings, or wheat-based, corn-based, and/or other farinaceous-based flours. It will be appreciated that these other farinaceous materials can replace the predominantly potato-based material to yield alternative formulations, such as tortilla chips. The production line starts with a mixer 1 to produce the dough for a wide variety of snack chips. Exemplary of such chip doughs is that described in U.S. Pat. No. 5,500,240.

The selected ingredients are blended to form a cohesive dough that is evenly re-hydrated but not overly sticky and is conducive to sheeting. The moisture in the dough is generally between 20% and 60% and the flow rate of the process water is adjusted to maintain the desired dough moisture. It will be appreciated that current oil-fried stackable snack chip and current sheeted and baked snack chip technologies utilize dough that is typically sheeted at a thickness of 0.40 mm to 0.80 mm before being cut into an appropriate pattern and that in the herein claimed invention and process, a dough sheet thickness of 0.40 mm to 0.80 mm or greater can be used and that the finished product will have a moisture typically of 1% to 3% by weight.

The dough is delivered from the mixer 1, which may be of a construction similar to that described in U.S. Pat. No. 4,013,234, to a conventional multi-roll sheeting unit 2 as currently used in the fabricated stackable chip industry or a multi-station sheeting system commonly used in the baking industry.

Figure 2:
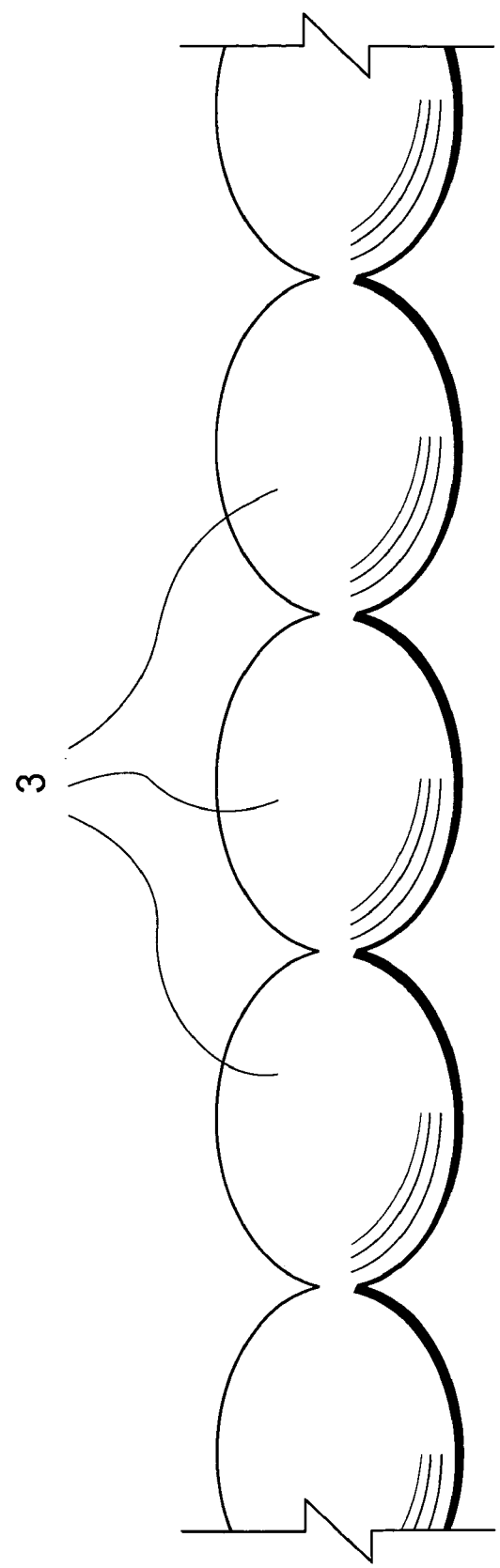
FIG. 2 is a top view of the chain link strip of dough blanks being processed in the production line.
Figure 3:
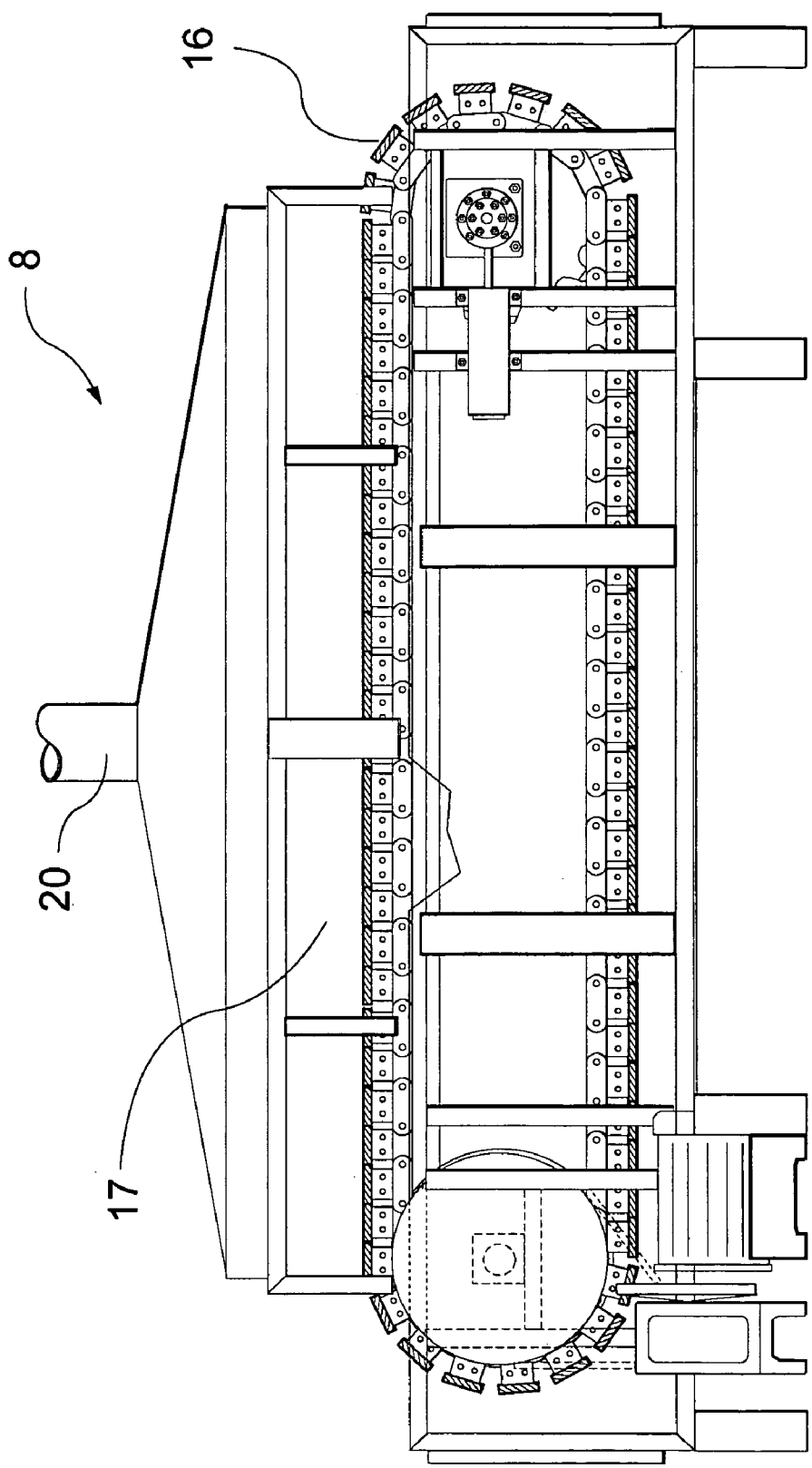
FIG. 3 is a left perspective view of the oven, with side panels removed, in the production line shown in FIG. 1.
Figure 4:
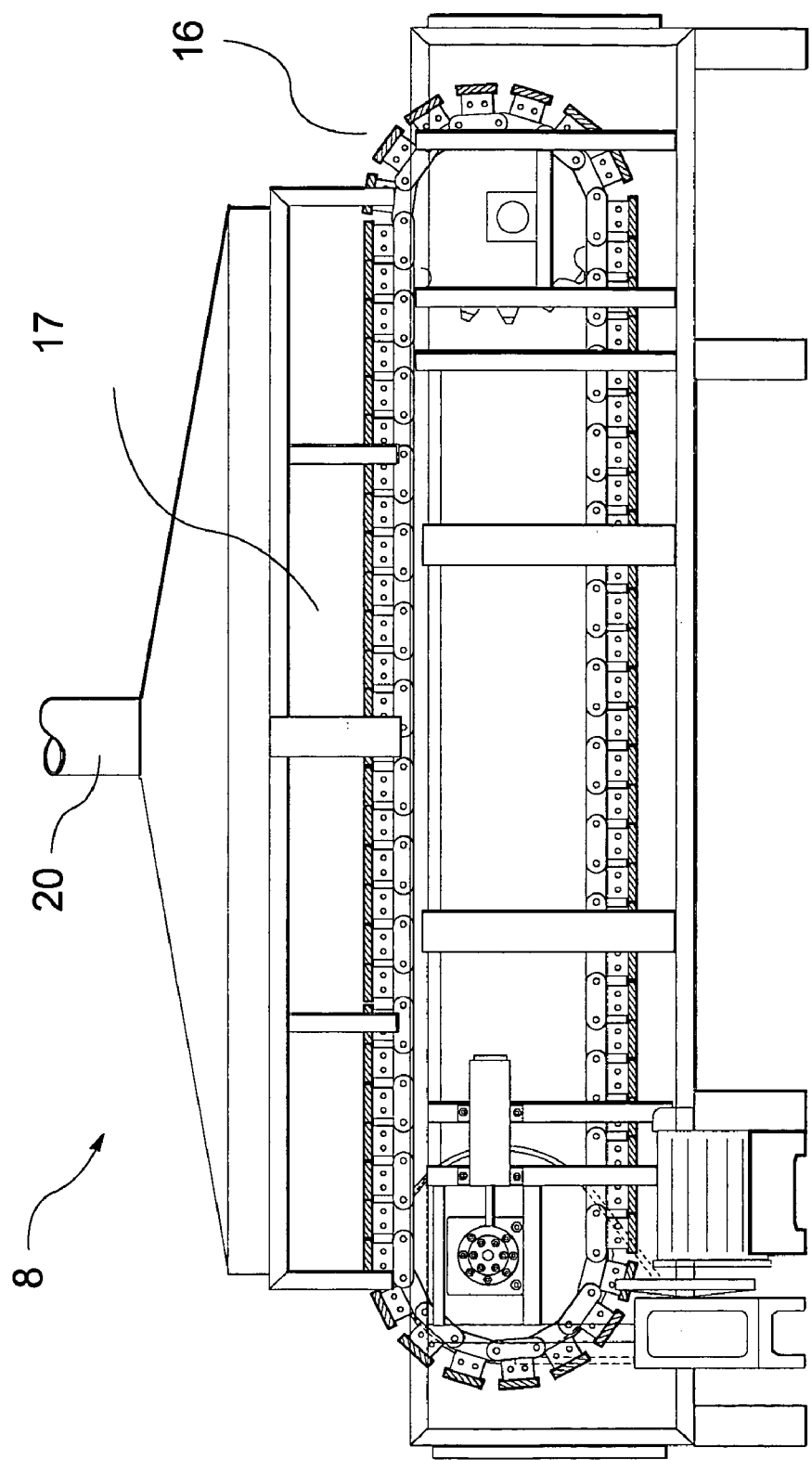
FIG. 4 is a right perspective view of the oven, with side panels removed, in the production line shown in FIG. 1.
Figure 5:
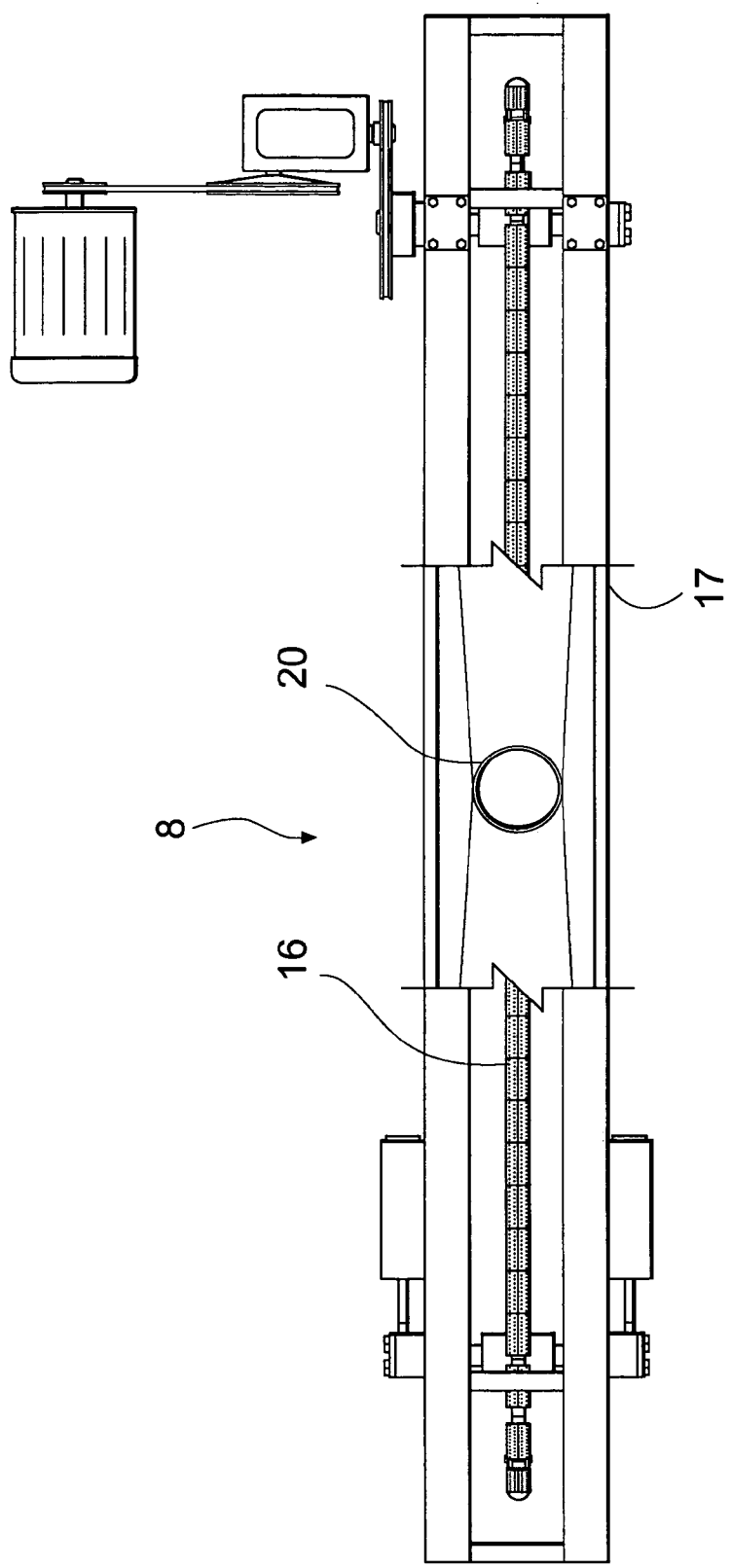
FIG. 5 is a top plan view of the oven, with side panels removed, in the production line shown in FIG. 1.
Figure 6:
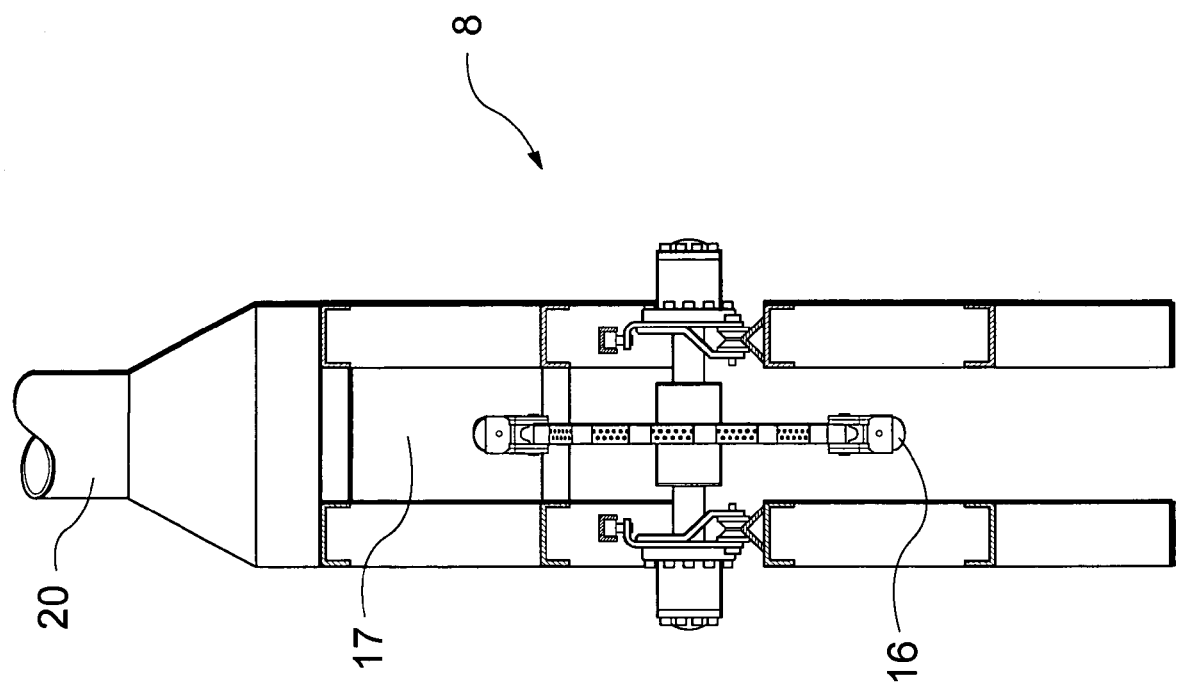
FIG. 6 is a perspective view of the in-feed end of the oven in the production line shown in FIG. 1.
Figure 7:
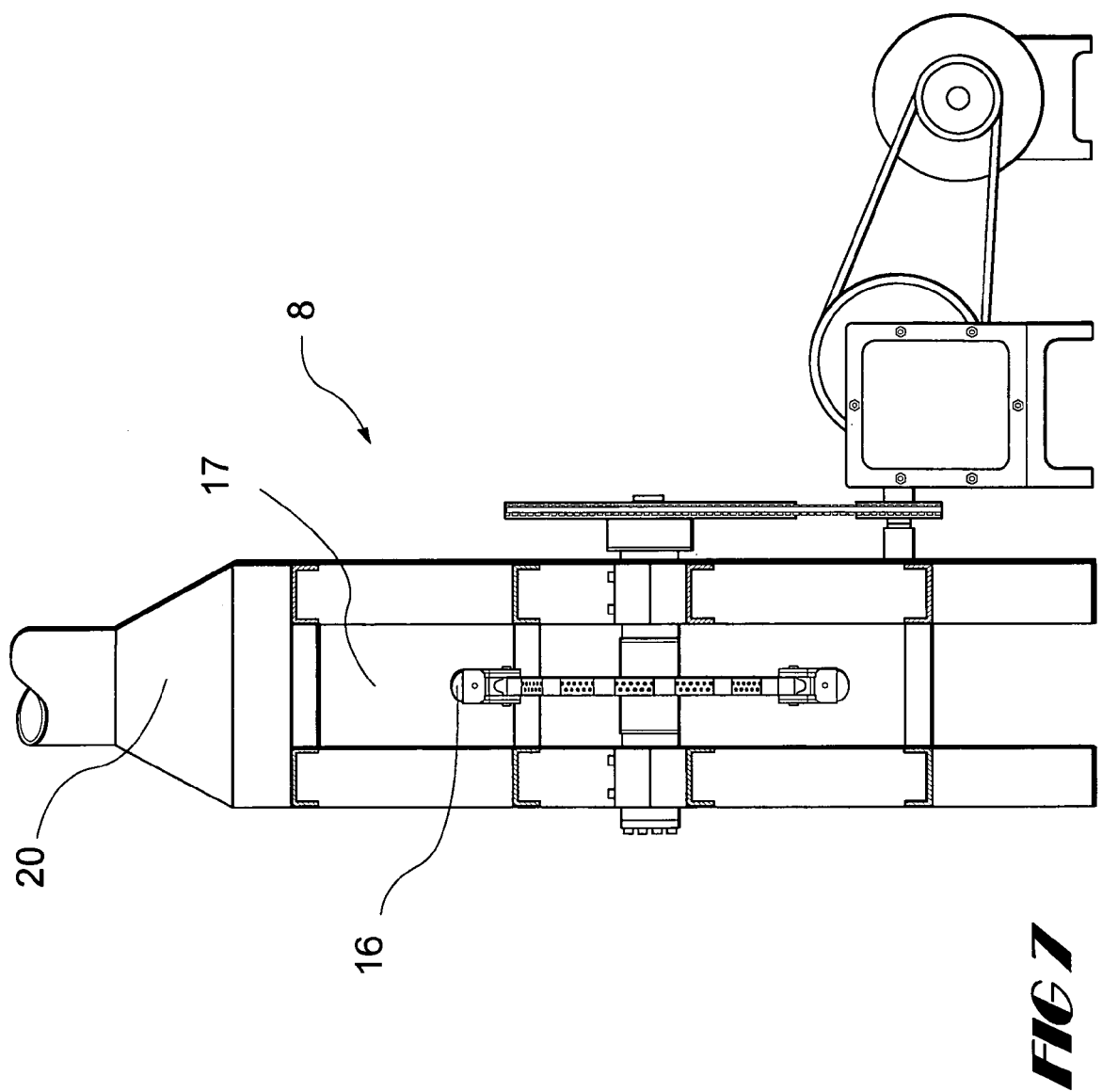
FIG. 7 is a perspective view of the discharge end of the oven in the production line shown in FIG. 1.

The resulting dough sheet is cut into a continuous chain of dough blanks 3 (shown in FIG. 2) using a rotary cutter 4 such as that described in U.S. Pat. No. 3,872,752 or in U.S. Pat. No. 4,108,033. The raw dough chain blanks 3 may be of any shape. If shaped as shown in FIG. 2 they ultimately become individually stackable, saddle-shaped chips. Additional details of this dough mixing, sheeting, and cutting are shown in U.S. Pat. No. 3,872,752. As the continuous-chain dough pattern is placed on top of the molds 16, which are shown in FIG. 3, the pliable continuous-chain of dough pieces 3 assumes the curvature of the molds 16, as shown in FIG. 10, prior to being transferred into the baking section 17 of the oven 8. Thus a continuous-chain of uniform and consistent-shaped snack chips is produced, as determined by the shape of cutting dies on the rotary cutter 4 and the curvature or shape of the endless chain mold 16 baking surface. Flat molds or molds of varying degrees of curvature can be used during baking of a continuous chain of dough pieces to produce alternative finished product designs.

FIG. 1 shows that the dough chains 3 are conveyed into an oven 8 via a transfer conveyor 6 where they are baked, the continuous chain of raw dough pieces 3 being aligned and moving in the same direction and at the same relative speed as the endless chain molds 16. The continuous chain of raw dough pieces 3 is sufficiently pliable to conform to the surface shape of the endless chain molds 16. Cut scrap is fed back to the mixer 1 via a scrap return conveyor system. The scrap return system shown in FIG. 1 is composed of incline conveyor 5, dough grinder 18, and pneumatic conveyor 19, which takes scrap dough to the mixer 1 to be combined with the incoming ingredients.

It will be appreciated that the speed, direction and alignment of the continuous chain of raw dough pieces 3 is relative to that of the lower endless chain link molds 16 so that the continuous chain of raw dough pieces 3 is neither stretched, folded, nor otherwise distorted as it is transferred onto the endless chain molds 16, thus maintaining the uniform shape and plane of each dough piece in the continuous chain of dough pieces 3 as produced by the rotary dough cutter 4 and plane of the endless chain molds 16.

The oven 8 is seen best in FIG. 3 to have a lower endless chain link mold 16, and many parallel lines of endless chain link molds may pass through the oven, though only one such line is shown here for clarity. The lower endless chain link mold 16 is driven in a bottom baking chamber 17.

Referring again to FIG. 1, at the discharge end of the oven 8 the baked, continuous chain of chips is transferred across dead-plate 9 and delivered onto the oven's discharge conveyor 10. The chain-link configuration enhances both the removal of the product from the oven, and the ability to uniformly and consistently treat the baked product. The gap over which the baked chip product must cross, from the molds 16 to the dead-plate 9, is more easily handled by a continuous chain of chips, in that once the first chip in the chain crosses the gap, all the other chips will follow and be pulled across. Discharge conveyor 10 carries the baked, continuous chain of snack chips to an oil spray machine 11 where the product could be sprayed with a thin layer of edible oil, the percent oil being 10% or less by weight of the finished product. The method of heating for the herein disclosed invention could be any and all types of heating currently available or used in the industry, either separately or in combination including but not limited to impingement heating, direct-fired heating, convection-type heating and/or electric heating. Furthermore, heating for the claimed invention can be from an internal and/or external heat source.

A heating source may be positioned below the endless chain molds 16 such that on the return cycle, the molds 16 receive sufficient radiant heat to be pre-heated prior to the introduction of the continuous-chain of raw dough pieces 3 onto the endless-chain molds 16. Thus, the continuous chain of raw dough blanks 3 is partially baked by the residual heat in the endless chain molds 16. Optional steam vent holes 21 in forming molds 16 (shown on FIGS. 8 & 9) permit the escape of steam and gases from the underside of the raw dough blanks 3 during the baking process. It will be appreciated that other hole configurations or mold designs are possible in order to control moisture loss during baking.

Due to heat transfer across the surface area of the continuous-chain of raw dough blanks 3, the edges of the raw dough blanks 3 tend to bake faster than the center, creating dark or over-baked edges and/or undercooked centers. Hot air may be introduced by way of blowers or similar mechanisms to offer greater control over the baking process and concomitant moisture loss across the edges and center of the raw dough blanks 3. In this way, hot air is forced over the continuous-chain of raw dough blanks 3 on the endless chain product forming molds 16 with at least one blower, thus facilitating more efficient baking. At least one fan located in the exhaust stack 20 exhausts steam and gases created during baking. The addition of a flue further improves control of moisture loss from the baking chamber 17.

The complete baking and the even moisture loss of the continuous chain of raw dough pieces 3 can be accomplished by delivering a stream of hot air to specific points or zones on the continuous chain of raw dough pieces 3 during the baking cycle. This stream of hot air could be produced internally within the oven 8 or from an external heat source and could be delivered with one or more fans or similar devices and could be designed in specific baking zones, as is typical in the general baking industry.

Thus, using continuous chains of raw dough pieces 3 in which the leading edge and trailing edge of each dough piece are integrally attached to the dough piece in front of it and the dough piece behind it significantly reduces the tendency of the leading and trailing edges of each dough piece to darken. Further, by applying heat to the centers of dough blanks with forming molds and/or various directions and speeds of hot air, a more uniform and controlled baking of the dough pieces is accomplished.

It will be appreciated that alternative shapes and sizes for the holes in the endless chain molds can be utilized to increase or decrease the rate of moisture loss. In addition, the oven's exhaust fan or fans could be used to control the amount of evaporated moisture from the product that is removed from the oven's baking chamber or chambers.

After baking at temperatures between 175° C. and 300° C. and for 1.0 minute to 4.5 minutes, the baked, continuous chain of dough pieces 3 is referred to as a baked, continuous chain of snack chips and is discharged onto a dead-plate 9 or similar device, positioned downstream of the product flow but not touching the endless chain of molds 16.

Utilizing a continuous chain of dough pieces 3 to produce a continuous chain of baked snack chips also facilitates the discharge of the baked snack chips from the forming molds 16 onto the dead-plate 9 or transfer conveyor. This is because a continuous chain of chips, each chip being integrally connected to the chip proceeding it and the chip following it, is similar to one extended chip, not a plurality of shorter individual chips. Accordingly, only one leading edge has to traverse the gap between mold 16 and dead-plate 9 or other receptacle with special assistance or monitoring to ensure that it does not fall below dead-plate 9, thus missing discharge conveyor 10 or similar receptacle. Pneumatic lifts are commonly used in stackable snack chip fryers to assist separate pieces in bridging the gap, and could be employed here as needed.

As shown on FIG. 1, at the discharge end of the oil-spray machine 11, the oil-sprayed, continuous chain of chips is transferred via conveyor 12 to a suitable seasoning applicator 13. The seasoning applicator 13 lightly coats the product with a prescribed percentage of appropriate seasoning, the percent of the seasoning being 5% or less by weight of the finished product.

After seasoning, the chain of snack chips are transferred via conveyor 14 to a suitable chip breaker 15 such as described in U.S. Pat. No. RE031819. The chip breaker 15 breaks the seasoned, continuous chain of snack chips into individual snack chips. The finished products are then transferred to the packaging department for packing in cylindrical cans or other sleeved-type containers.

It will be appreciated that the pliability of the dough allows each piece in the continuous chain of dough pieces 3 to conform to the shape of the continuous-chain molds 16, this being from flat to inverted "V"-shaped or any variation thereof, but preferably an inverted "U"-shape to enhance stackability and reduce breakage. The finished baked snack chips are uniformly and consistently shaped and are conducive to stacking in cylindrical canisters or other sleeved-type containers.

In an alternative form of the invention, the dough is only partially baked and then fried. Uniformly and consistently-shaped, low-fat snack chips are produced by cutting dough pieces of any desired shape as a continuous chain from a sheet of farinaceous-based dough having a thickness of 0.40 mm to 0.80 mm or greater and baking this continuous chain of dough pieces in an oven that features a lower endless chain mold configuration. More specifically, the raw dough chain of blanks, sheeted to a thickness of 0.40 mm to 0.80 mm, are baked in an oven having an endless lower chain mold for 30 to 90 seconds at between 175° C. and 300° C. With a moisture content of 20% to 60% by weight, preferably less than 25%, the partially baked chain is conveyed from the oven into a fryer, where it is fried to a final curved, consistent, stackable shape at a temperature between 175° C. and 190° C. for between 3 and 15 seconds, preferably for less than 10 seconds. After frying, the chain is seasoned and segmented as before. Though the chips of this embodiment do have a higher oil content than those of the previously described embodiment, namely of between 15% and 25% by weight, being partially fried they do tend to have more taste yet still have a lower oil content than continuous-chain dough pieces that are fried in a fryer as described in U.S. Pat. No. 3,905,285. Thus, the percent oil of the partially-baked and fried snack chips of this invention is higher than 10% but less than that typical of fried, stackable snack chips, which are 28% to 40% oil by weight.

It thus is seen that a method is now provided for commercially producing low-fat and reduced-fat stackable snack chips. Although the new methods have been shown and described in their preferred forms, it should be understood that many modifications, changes or additions may be made thereof without departure from the spirit and scope of the invention as set forth in the following claims.

The invention claimed is:

1. A method of producing stackable, farinaceous based low-fat snack chips which comprises the steps of forming a farinaceous based dough into a chain link strip divided into a plurality of links; baking the strip in a baking oven with each link of the dough chain link strip supported by a non-vented lower mold; removing the baked strip from the oven; coating the strip with oil; and breaking the strip into individual stackable chips; characterized in that the links are supported solely by the non-vented lower mold in the oven.

2. The method of claim 1 wherein the dough is formed into a strip having a thickness of at least 0.4 mm.

3. The method of claim 1 wherein the dough is formed into a strip having a thickness of between 0.4 mm and 2.0 mm.

4. The method of claim 1 wherein the strip is baked on an endless chain link mold.

5. The method of claim 1 wherein the baked strip has a moisture content of 1% to 3% by weight.

6. The method of claim 1 wherein the strip is coated with oil to have approximately 1% to 10% oil by weight.

7. The method of claim 1 wherein the strip is seasoned after having been coated with oil.

8. The method of claim 1 wherein the strip is baked for between 1 and 5 minutes at a temperature of between 175° C. and 300° C.

9. The method of Claim 1 wherein the strip is guided onto an oven discharge conveyor, including but not limited to a deadplate.

10. The method of claim 1, further including blowing hot air over the links supported on the lower mold.

* * * * *